(12) United States Patent
Blagodurov et al.

(10) Patent No.: US 11,237,928 B2
(45) Date of Patent: Feb. 1, 2022

(54) METHOD FOR A RELIABILITY, AVAILABILITY, AND SERVICEABILITY-CONSCIOUS HUGE PAGE SUPPORT

(71) Applicant: Advanced Micro Devices, Inc., Santa Clara, CA (US)

(72) Inventors: Sergey Blagodurov, Bellevue, WA (US); Michael Ignatowski, Austin, TX (US); Vilas Sridharan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 60 days.

(21) Appl. No.: 16/700,993

(22) Filed: Dec. 2, 2019

(65) Prior Publication Data

US 2021/0165721 A1  Jun. 3, 2021

(51) Int. Cl.
*G06F 11/00* (2006.01)
*G06F 11/20* (2006.01)

(52) U.S. Cl.
CPC ...... *G06F 11/2094* (2013.01); *G06F 2201/82* (2013.01)

(58) Field of Classification Search
CPC ............. G06F 11/2094; G06F 11/1448; G06F 11/1451; G06F 11/1458; G06F 11/1466
See application file for complete search history.

(56) References Cited

U.S. PATENT DOCUMENTS

2016/0147623 A1* 5/2016 Ping .................... G06F 11/1666
                                                                714/6.13
2018/0307431 A1* 10/2018 Gunnam ................ G11C 29/44

OTHER PUBLICATIONS

Ashburn, John. Lwn.net. (2019). HWPOISON [LWN.net]. [online] Available at: https://lwn.net/Articles/348886/ [Accessed Dec. 3, 2019].
Ramos, Luiz E., Eugene Gorbatov, and Ricardo Bianchini. "Page placement in hybrid memory systems." Proceedings of the international conference on Supercomputing. ACM, 2011.

* cited by examiner

*Primary Examiner* — Katherine Lin
(74) *Attorney, Agent, or Firm* — Liang & Cheng, PC

(57) ABSTRACT

A method includes reserving memory capacity in a first memory device as patch memory region for backing faulted memory, receiving a memory error indication indicating an uncorrectable error in a faulted segment in a second memory device and, in response to the memory error indication, associating in a remapping table the faulted segment with a patch segment in the patch memory region. The faulted segment is smaller than a memory page size of the second memory device. The method also includes, in response to receiving a memory access request directed to the faulted memory segment, servicing the memory access request from the patch segment by querying the remapping table to determine a patch segment address corresponding to a requested memory address, where the patch segment address identifies the location of the patch segment, and based on the patch segment address, performing the requested memory access at the patch segment.

20 Claims, 6 Drawing Sheets

METHOD FOR A RELIABILITY, AVAILABILITY, AND SERVICEABILITY-CONSCIOUS HUGE PAGE SUPPORT

BACKGROUND

A non-uniform memory access (NUMA) computing system includes a network of multiple nodes connected to each other by a high-performance data interconnect fabric, which can have multiple system buses. Each node in the NUMA system can have zero or more processing units, memory, and/or input/output (I/O) buses. A memory controller in the NUMA system allows each node to use remote memory located on any of the other nodes in addition to its own local memory, effectively creating a single system image.

Memory capacity provided by NUMA systems (e.g., in datacenter servers) will become increasingly larger, distributed, and heterogeneous, consisting of different types of memory media (e.g., stacked dynamic random access memory (DRAM), off-package DRAM, X-Point Non-Volatile Memory, Phase-Change Memory (PCM), etc.) placed across the system and connected via a data fabric. As a result of the ever-increasing memory capacities, and to limit translation lookaside buffer (TLB) overhead, the sizes of the operating system (OS) and Hypervisor (HV) memory pages are also increasing (e.g., from 4 KB to 2 MB to 1 GB).

BRIEF DESCRIPTION OF THE DRAWINGS

The present disclosure is illustrated by way of example, and not by way of limitation, in the figures of the accompanying drawings.

DETAILED DESCRIPTION

Figure 1:
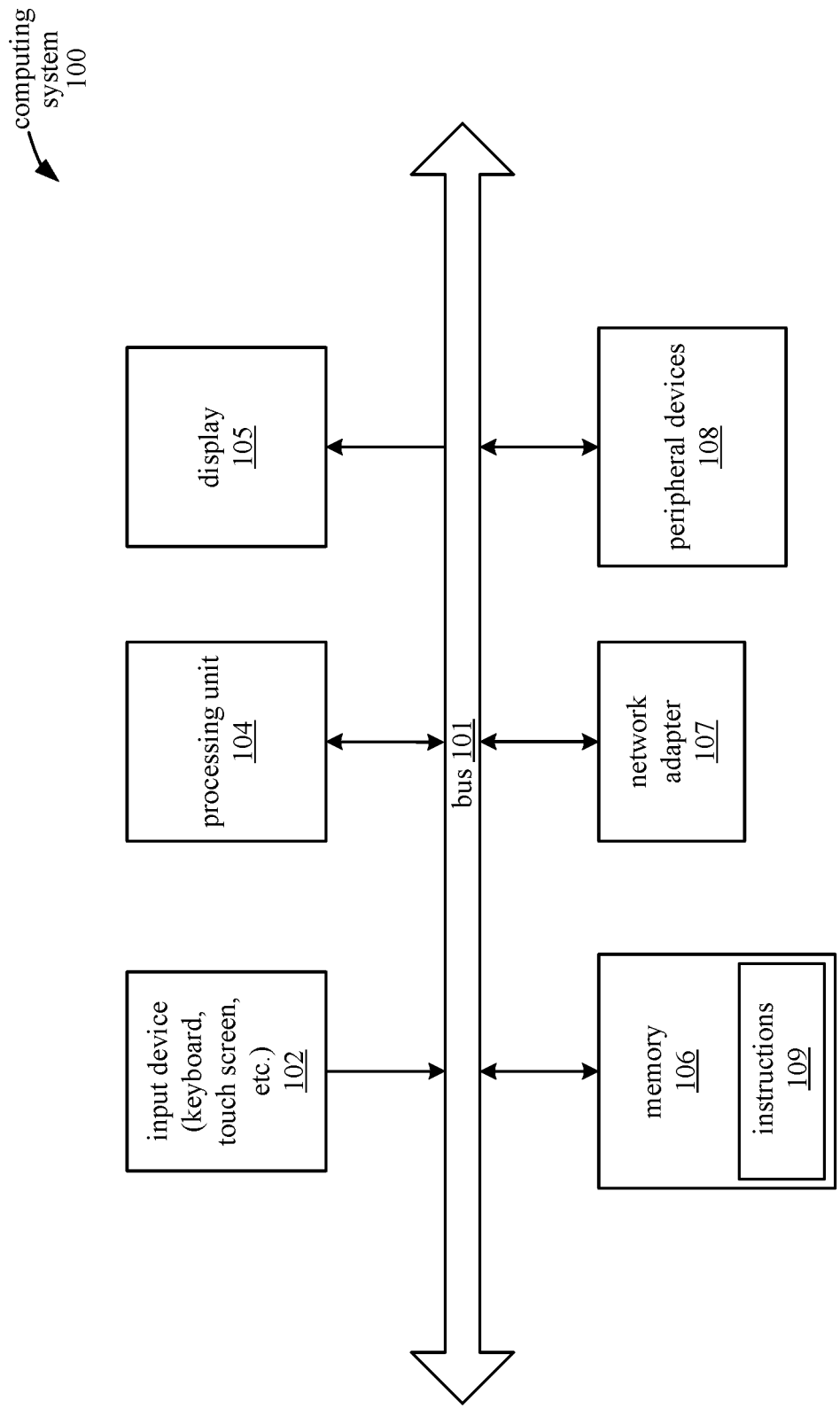
FIG. 1 illustrates a computing system, according to an embodiment.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A page, memory page, or virtual page is a fixed-length contiguous block of virtual memory, described by a single entry in a page table. A memory page is the smallest unit of data for memory management in a virtual memory operating system. As the amount of available memory capacity in a system increases, the number of memory pages also increases if the page size remains the same. As a result, TLB overhead can become prohibitively expensive. Thus, the page size is increased (e.g., from a default page size of 4 kilobytes (KB) to 2 megabytes (MB), 1 gigabyte (GB), or larger).

An increase in memory size corresponds to an increase in memory failures. While single bit data errors can be corrected via error correction codes (ECC), multi-bit data errors cannot. For these uncorrectable errors, the hardware generates a trap which in turn causes a kernel panic, or the page is marked as "poisoned", delaying handling of errors and allowing for a more graceful recovery from and isolation of uncorrected memory errors rather than just crashing the system.

The ability of the operating system/hypervisor (OS/HV) to retire a page of physical memory with excessive error rates works well with smaller pages (e.g., 4 KB), but is inefficient for huge page sizes (e.g., greater than 1 GB) because a small number of uncorrectable bit errors could cause an entire 1 GB page to be retired, wasting a large amount of the system's available memory capacity.

In one embodiment, a computing system avoids retiring an entire large memory page due to a few faulty bits by transparently remapping the faulty memory portion so that the OS can continue using the memory page as usual. A faulty segment of the memory page is remapped to patch memory in a static random access memory (SRAM) buffer device local to a memory controller for the page, or in another memory device elsewhere in the system (e.g., on another NUMA memory node). Memory read or write accesses directed to the faulty region are redirected to the patch memory where the read or write is performed. The computing system remaps faulty physical memory segments that are 4 KB in size or smaller, so only a small portion of additional memory is used to keep the remainder of the large (e.g., 2 GB) memory page in service.

When the faulty memory segment is remapped to patch memory in the local memory controller, the patch memory is pre-allocated from spare SRAM in the memory controller's scratchpad memory (SPM) and a remapping table is also set up in the SPM to associate the address of the faulty memory segment with the address of the patch segment.

When the faulty memory segment is remapped to another memory device elsewhere in the computing system, the patch memory is pre-allocated from a memory device in the same memory node or from a different memory node connected via a data interconnect fabric. In one embodiment, the patch memory is pre-allocated from spare DRAM memory. A remapping table is maintained by control logic in a data fabric requester to associate the faulty segment with the patch segment. The fabric requester handles communication between processing cores and other devices, including memory nodes, via the data fabric. Thus, memory requests for data in the faulty segment that originate from the processing cores are appropriately redirected to the patch segment by the fabric requester.

The fabric requester also maintains a set of reliability, availability, and serviceability (RAS) counters to track the rate of uncorrectable errors observed in the memory nodes. An amount of patch memory is preallocated in proportion to the maximum error rate recorded in the RAS counters for a predetermined number of prior runs of the system. The fabric requester thus reserves an appropriate amount of patch memory by proactively predicting based on past fault history how many 4 KB patch segments to pre-allocate for future use. This increases the likelihood that when uncorrectable faults occur, a sufficient number of patch segments will be available for remapping the faulty segments without delay.

In one embodiment, if the control logic in the fabric requester detects that threads accessing the faulty segment are running locally on a NUMA node, then the patch segment is placed in memory that resides in the same node and is controlled by the same memory controller. This avoids an increase in the number of expensive interconnect accesses that would occur over the data interconnect fabric if the patch memory were placed on a different memory node. If the memory media for the faulty segment is subject to wear-out or is on a device having a significant number of faults due to wear-out, the patch segment is located in memory that is less susceptible to wear-out, such as DRAM that is located in another memory node and controlled by a different memory controller.

FIG. 1 illustrates an embodiment of a computing system 100 in which the above remapping scheme is implemented. In general, the computing system 100 is embodied as any of a number of different types of devices, including but not limited to a laptop or desktop computer, mobile device, server, network switch or router, etc. The computing system 100 includes a number of hardware resources, including components 102-108, which communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as external peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes a processing unit 104. The processing unit 104 receives and executes instructions 109 that are stored in a memory system 106. In one embodiment, the processing unit 104 includes multiple processing cores that reside on a common integrated circuit substrate. Memory system 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102.

Other embodiments have more than one of a particular component; for example, an embodiment of computing system 100 could have multiple processing units 104, buses 101, network adapters 107, memory systems 106, etc.

Figure 2:
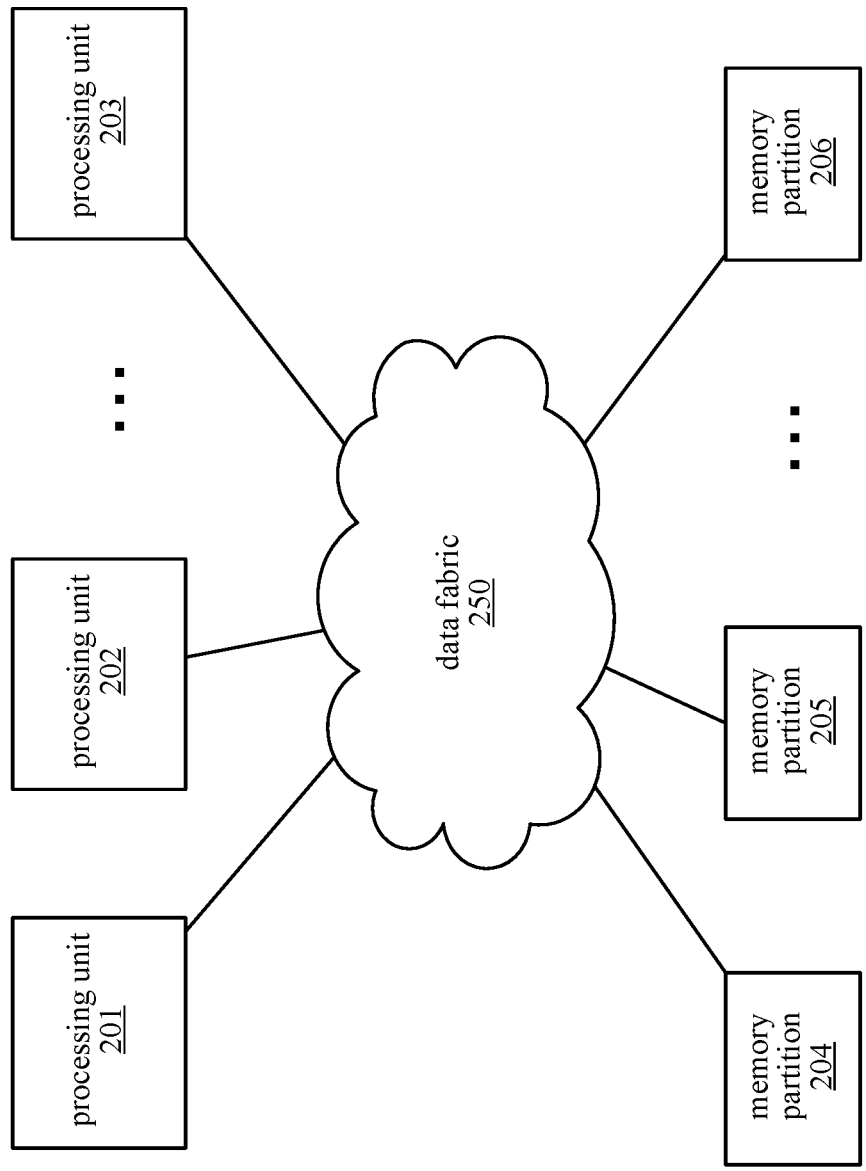
FIG. 2 illustrates processing and memory nodes in a computing system, according to an embodiment.

In one embodiment, the computing system 100 is a NUMA system in which the processing units 104 are implemented as multiple processing units and memory partitions connected by data fabric 250, as illustrated in FIG. 2. The data fabric 250 connects multiple NUMA computing nodes together, which include processing units 201-203 and memory partitions 204-206. In one embodiment, these computing nodes 201-206 reside within the same device package and on the same integrated circuit die. For example, all of the nodes 201-206 can be implemented on a monolithic central processing unit (CPU) die having multiple processing cores. In an alternative embodiment, some of the nodes 201-206 reside on different integrated circuit dies. For example, the nodes 201-206 can reside on multiple chiplets attached to a common interposer, where each chiplet has multiple (e.g., 4) processing cores.

The data fabric 250 includes a switch network and multiple interconnect links that provide, for each of the nodes 201-206, a transmission path to communicate with any other one of the nodes 201-206. In one embodiment, the data fabric 250 provides multiple different transmission paths between any pair of origin and destination nodes, and a different transmission path for any given origin node to communicate with each possible destination node.

Figure 3A:
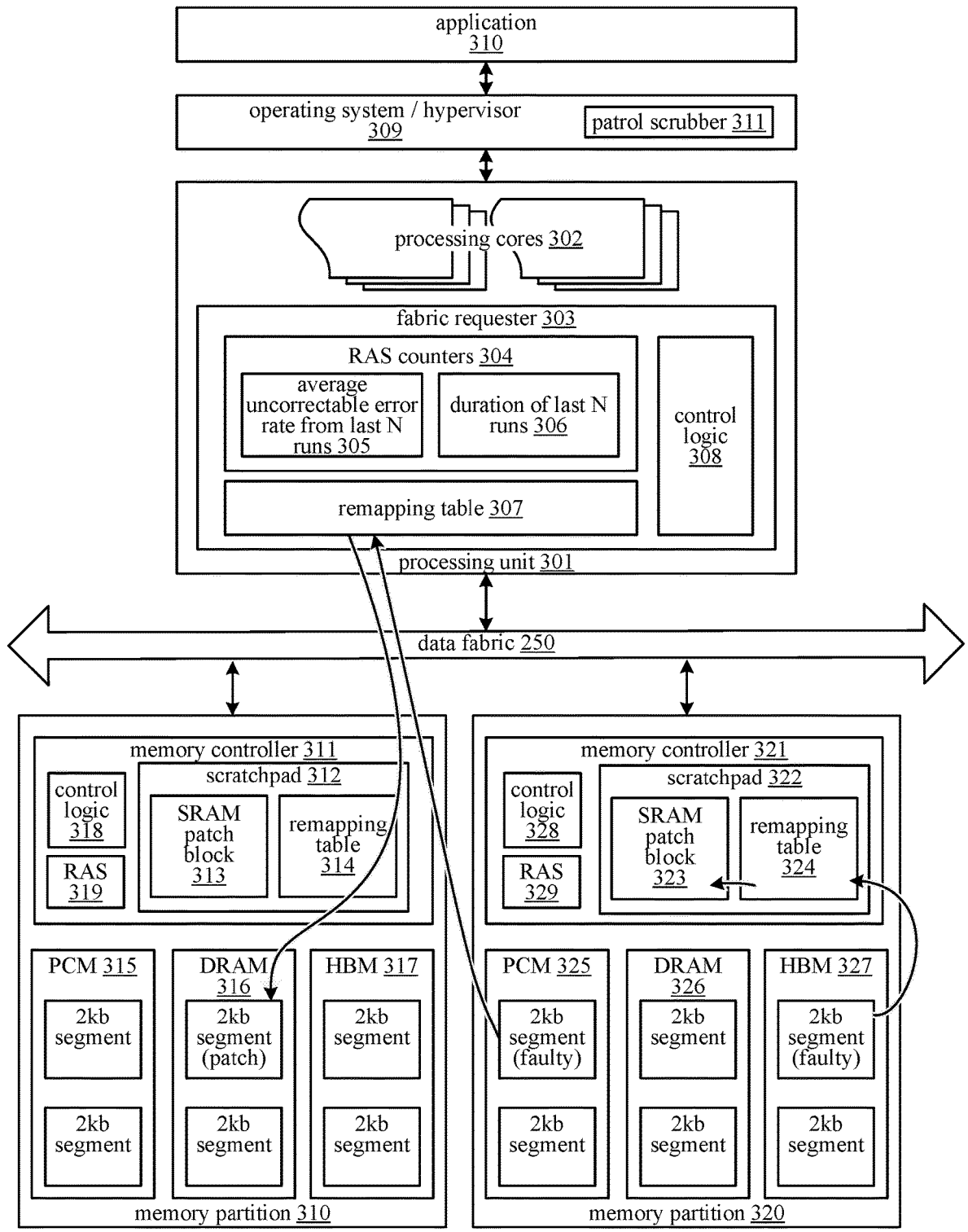
FIG. 3A is a block diagram illustrating components of a computing system, according to an embodiment.

FIG. 3A illustrates components in the computing system 100, including a processing unit 301 and memory partitions 310 and 320, according to an embodiment. These nodes 301, 310, and 320 communicate with each other via the data fabric 250. Each of the memory partitions 310 and 320 includes multiple memory devices. Partition 310 includes PCM 315, DRAM 316, and high bandwidth memory (HBM) 317, while partition 320 includes PCM 325, DRAM 326, and HBM 327. In partition 310, memory controller 311 is coupled with the data fabric 250 and provides an interface for accessing each of the memory devices 315-317. Memory controller 311 also includes SRAM scratchpad memory (SPM) 312 that stores a patch block 313 and a remapping table 314. Similarly, memory controller 321 provides an interface for accessing the memory devices 325-327 in partition 320 and includes SPM 322 containing its own patch block 323 and remapping table 324.

The processing unit 301 includes multiple processing cores 302 and a data fabric requester 303, which serves as an interface between the processing cores 302 and the data fabric 250. The fabric requester 303 receives messages (e.g., memory access requests) from the processing cores 302 that are destined for other nodes and transmits the messages to their destinations via the data fabric 250. The fabric requester 302 also receives messages from other nodes via the data fabric 250 that are destined for the processing cores 302.

The processing unit 301 executes an operating system/hypervisor (OS/HV) 309 that further supports execution of a user application 310 by the processing unit 301. Instructions of the application 310 and OS/HV 309 are executed in the processing cores 302. During operation, the OS/HV 309 includes a patrol scrubber 311 that traverses memory pages in the partitions 310 and 320 and corrects any correctable errors (e.g., correcting single-bit errors using ECC). During this process the patrol scrubber 311 detects the number of correctable and uncorrectable errors in the traversed memory pages. When the patrol scrubber 311 detects that an uncorrectable fault has occurred, or that a rate or number of correctable faults has exceeded a threshold, the patrol scrubber 311 issues a memory error indication to notify the fabric requester 303, OS/HV 309, and/or the memory controller 311 or 321 for the memory device in which the error or errors occurred.

If an uncorrectable error is detected in a memory page, the page is considered faulted and the faulted segment within the page is remapped to an available segment of patch memory. If an excess of correctable errors is detected, the page is considered failing (i.e., the page is likely to have an uncorrectable error soon), and the failing memory segment where the correctable errors were detected is remapped to an available segment of patch memory.

Detection of uncorrectable errors is also triggered by memory accesses initiated by the application 310 independently from the operations of the patrol scrubber 311. If the application 310 attempts to access data that has an uncorrectable error, the memory controller 311 or 321 for the memory device in which the data is stored issues a memory error indication to notify the fabric requester 303 and/or the OS/HV 309. In response to the indication, the faulty segment is remapped to an available segment of patch memory.

The fabric requester 303 includes control logic 308 that, in response to receiving a memory error indication that a particular segment of memory is faulted (due to an uncorrectable error) or failing (due to excess correctable errors), patches the faulty (i.e., having uncorrectable or correctable errors) memory segment by creating or updating a remapping table 307 in the fabric requester 303. The remapping table 307 associates the faulty segment with a patch segment. As illustrated in FIG. 3A, the faulted 2 KB segment in PCM 325 is associated via remapping table 307 with the patch segment in DRAM 316. Thus, the faulty segment resides in a different memory node than the patch segment. Both the faulty or failing segment and the patch segment as shown are 2 KB in size, and are smaller than the size of a memory page. In alternative embodiments, the segments can be other sizes (e.g., 4 KB) that are smaller than the size of the memory page.

In one embodiment, the control logic 308 determines where the patch segment should be located based on whether the faulty memory device is a memory type that is subject to wear-out (e.g., flash memory). If the faulty memory is subject to wear-out, a patch segment is selected from a different memory device that is less susceptible to wear-out, such as a DRAM device in a different NUMA node.

In one embodiment, the control logic 318 and 328 also maintains remapping tables 314 and 324 and patch memory 313 and 323 in the local memory controllers 310 and 320, respectively, for backing the faulty memory segments in patch segments residing locally in the same memory node. As illustrated in FIG. 3A, the faulted 2 KB segment in HBM 327 is associated via remapping table 324 with a patch segment in the SRAM patch block 323.

In one embodiment, a patch segment is selected from the patch block 323 of the local memory controller 321 for the memory device 327 containing the faulty memory segment based on access patterns for the faulty memory segment. For example, the memory controller 321 (or alternatively, control logic 308) selects a patch segment from the patch block 323 in the SPM 322 of the local memory controller 321 for backing a faulty segment in HBM 327 in response to detecting that one or more threads or processes executing in the same NUMA node 320 or a nearby NUMA node. In this case, patching the faulty memory in the local memory controller 321 avoids an increase in communication overhead due to the patching, since messages need not be sent over the data fabric 250 to a more distant node.

In one embodiment, the patch memory is pre-allocated at boot time for patching memory segments that will become faulted or failing during the subsequent run of the system. The number of pages the amount of memory capacity reserved for patch memory is determined based on metrics recorded by a set of reliability, availability, and serviceability (RAS) counters 304. The control logic 308 in the fabric requester 303 maintains the RAS counters 304 to track the average rate 305 of uncorrectable errors occurring in the last N runs of the system 100.

In one embodiment, the RAS counters increment in response to each occurrence of an uncorrectable error observed in the memory partitions 310 and 320, and any other memory in the system. In some embodiments, errors are tracked separately for each memory partition, memory device, page, or segment. The RAS counters 304 also track the duration 306 of the last N runs of the system for determining the error rate. At boot time, the control logic 308 reserves for the patch memory a number of pages proportional to the maximum observed fault rate for the last N runs.

By using the error metrics provided by the RAS counters 304, the patching mechanism is able to reserve a sufficient amount of patch memory so that when an uncorrectable error occurs or excessive correctable errors are detected, a patch segment is immediately available for patching the faulty memory segment. Alternative embodiments do not pre-allocate the patch memory at boot time, and instead select a patch memory segment from memory that is available at the time the uncorrectable error or excessive correctable errors are detected.

In one embodiment, RAS counters also reside in locations other than the fabric requester 303, or are distributed across multiple components rather than being centralized in one device. For example, control logic units 318 and 328 in the memory controllers 311 and 321 maintain local RAS counters 319 and 329, respectively, for similarly tracking error metrics for their respective memory devices. Accordingly, the control logic units 318 and 319 in memory controllers 311 and 321 are similarly able to pre-allocate patch memory capacity in their respective patch blocks 313 and 323 according to the error rates recorded in their respective RAS counters 319 and 329.

After a faulty memory segment has been remapped to a working patch segment, memory accesses directed to the faulty segment are redirected to the associated patch segment, and the memory access is serviced from the patch segment. Upon receiving a memory access request, the fabric requester 303 or memory controller 311 or 321 queries its remapping table 307, 314, or 324 to determine a patch memory address corresponding to the memory address specified by the memory access request. The patch memory address identifies the patch segment in the patch memory region that is used to back the faulty memory segment. The memory request is then serviced from the patch segment; that is, the requested data is read from the patch segment (in the case of a memory read access), or data is written to the patch segment (in the case of a memory write access).

In one embodiment, application 310 is one of multiple applications sharing the same data in a faulty memory segment that is remapped to a patch segment. When an uncorrectable error occurs in the shared data, the memory segment containing the data is remapped, and a cacheline corresponding to the faulted memory is marked as "poisoned" so that the OS/HV 309 and/or other applications sharing the data can determine that the data is corrupted when the applications attempt to access the data.

In one embodiment in which the remapped faulty or failing pages are in persistent memory, the remapping tables 307, 314, and 324 are saved to non-volatile memory prior to powering down the volatile memories in which they are stored. Subsequently, the remapping tables 307, 314, and 324 are restored at boot time so that the faults or failing memory conditions persisting in the main memory need not be redetected and remapped again.

Figure 3B:
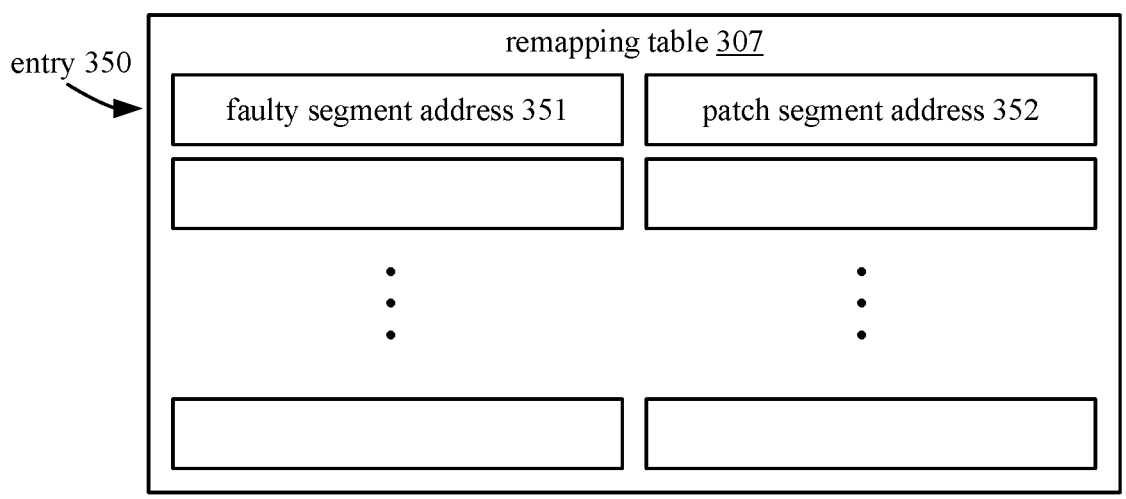
FIG. 3B illustrates a remapping table, according to an embodiment.

FIG. 3B illustrates entries in the remapping table 307, according to an embodiment. The remapping table 307 includes multiple entries each associating a memory address of faulty segment with an address of a patch segment. For example, entry 350 associates the address 351 of a faulty segment with the address 352 of a patch segment. The addresses in the remapping table 307 can be located on any of the memory nodes in the system 100. In one embodiment, local remapping tables such as tables 314 and 324 are similarly structured, but include addresses within the same local memory node.

Figure 4:
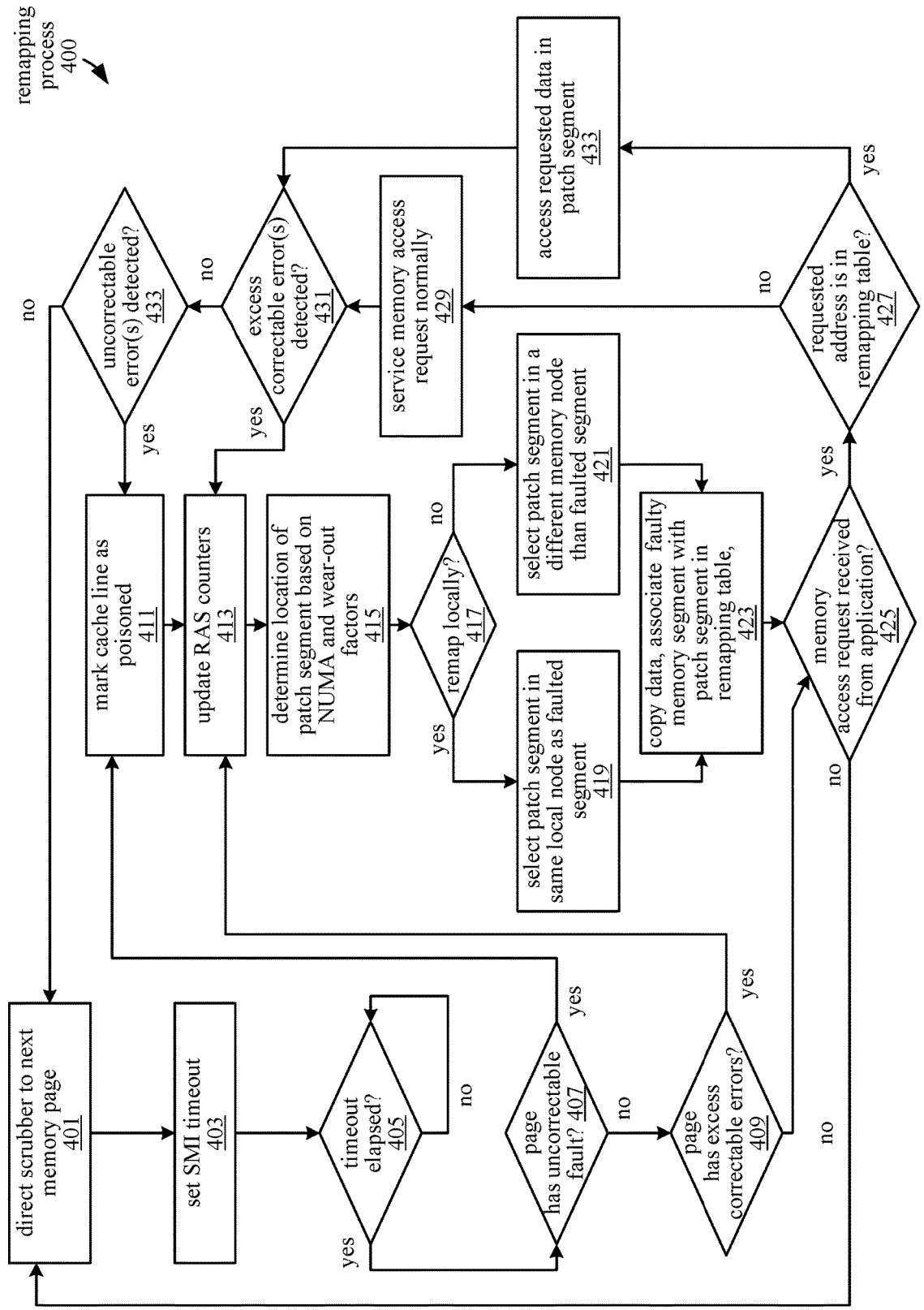
FIG. 4 is a flow diagram illustrating a process for remapping faulty memory segments during operation of a computing system, according to an embodiment.

FIG. 4 is a flow diagram illustrating a process 400 for remapping faulty memory segments during operation of a computing system 100, according to an embodiment. The operations in process 400 are performed by components of the computing system 100, including the data fabric requester 303, memory controllers 311 and 321, etc. The process 400 begins at block 401.

At block 401, the OS/HV 309 directs the patrol scrubber 311 to the next memory page in one of the memory partitions (e.g., 310 or 320) in the system 100 to be checked for correctable and uncorrectable errors. At block 403, a system management interrupt (SMI) timeout is set to allow the patrol scrubber 311 an amount of time (e.g., 10 milliseconds, or another duration depending on the system) for checking the page. In one embodiment, the patrol scrubber 311 operates continuously as a background process to check each memory page in the system 100 and correct any correctable errors it detects.

At block 405, the process 400 waits until the timeout elapses, then proceeds to block 407. If at block 407, no uncorrectable fault was detected by the patrol scrubber 311, and at block 409, the patrol scrubber 311 did not detect an excess of correctable errors, then the process 400 continues at block 425 without remapping any memory segments. However, if the patrol scrubber 311 detected an uncorrectable fault, then from block 407, the process continues at block 411. At block 411, the cache line associated with the faulted memory segment is marked as "poisoned"; that is, an indication is recorded marking the data in the cache line as corrupt so any applications attempting to access the data can determine that the data is unreliable.

At block 409, if the patrol scrubber 311 detected an excess of correctable errors, the process 400 proceeds to block 413. In one embodiment, an excess of correctable errors is detected when the most recent page scrubbing detects a number of correctable errors exceeding a threshold, or when a number of correctable errors detected over a specific time period exceeds a threshold. The process 400 thus arrives at block 413 when any uncorrectable errors have been detected, or when an excess of correctable errors have been detected by the patrol scrubber 311.

At block 413, the RAS counters are updated to account for the newly detected uncorrectable and/or correctable errors. In blocks 415-423, the faulty or failing memory segment is remapped to a patch segment. At block 415, the control logic 308 (or alternatively, logic 318 or 328) determines where to place the patch segment based on various factors, such as whether the faulty memory device is a memory type that is subject to memory wear-out, or whether the memory is being accessed primarily by processes running locally in the same node. In one embodiment, if the memory is subject to memory wear out, the control logic 308 selects a patch segment location in a different memory device that is less susceptible to wear-out. For example, as shown in FIG. 3A, PCM 325 is susceptible to wear-out, so its faulted segment is remapped to DRAM 316 located in a different NUMA memory node 310.

If the memory is primarily being accessed by one or more local threads or processes executing in the same NUMA node, the control logic 308 selects a patch segment location on a local memory device that is also in the same node (e.g., controlled by the same memory controller), to avoid additional communication over the data fabric 250 as a result of the remapping.

At block 417, if the faulty memory segment will be remapped to a patch segment in the local memory node, the process 400 continues at block 419. At block 419, the patch segment is selected from pre-allocated patch memory in the same local memory node as the faulty segment. For example, the faulty 2 KB segment in HBM 327 is remapped to a patch segment in the patch block 323 in the same memory node 320. Alternatively, a patch segment can be selected from the DRAM 326 in the same memory node 320.

At block 417, if the faulty memory segment will be remapped to a patch segment in a remote NUMA node, the process 400 continues at block 421. At block 421, a patch segment is selected from pre-allocated patch memory residing in a different memory node than the faulty memory segment. For example, the 2 KB patch segment in DRAM 316 is selected from a different node 310 than the node 320 in which the faulted segment in PCM 325 resides.

At block 423, data is copied from the faulty memory segment to the selected patch segment, and the selected patch segment is associated with the faulty memory in a remapping table. In the case where remapping is triggered by an excess number of correctable errors in the faulty segment, the corrected data is copied to the patch segment. When the faulty segment has one or more uncorrectable errors, the faulty data is still copied to the patch segment; however, since the cache line was poisoned, any applications attempting to access the data can determine that the data was corrupted.

When the selected patch segment is located in a remote node, the remapping is performed by control logic 308 in the fabric requester 303, which adds an entry 350 to the remapping table 307 associating a location 351 of the faulty memory segment with a location 352 of the patch segment, as shown in FIG. 3B. When the selected patch segment is located in the local memory node, the remapping is performed by control logic (e.g., 318 or 328) in a memory controller (e.g., 211 or 321) of the node. For example, when remapping the faulty 2 KB segment in HBM 327, the control logic 328 adds an entry to the remapping table 324 that associates a location of the faulty segment with the location of a patch segment in the patch block 323.

Whether the patch segment is remapped locally or remotely in a different node, the patch segment and the faulty segment are each smaller than the size of a memory page of the memory device in which the faulty segment resides. Accordingly, only a relatively small faulted or failing segment of the memory page is remapped, allowing the remainder of the large memory page to remain in service by consuming a relatively small additional amount of patch memory. In one embodiment, the patch segment is a different size than the associated faulty segment; for example, the patch segment can be larger than the faulty segment to include metadata.

At block 425, if no memory access request is received from the application 310, the process 400 returns to block 401 to continue the background patrol scrubbing of memory pages. At block 425, if a memory access request is received from the application 310, the control logic units 308, 318, or 328 query their respective remapping tables 307, 314, and/or 324 to determine whether the memory access request is directed to a fault memory segment that has been remapped.

At block 427, if the requested memory address specified by the memory access request is not present in one of the remapping tables 307, 314, and/or 324, the memory access request is serviced normally from its original location in the main memory, as provided at block 429. At block 427, if the requested memory address is present in one of the remapping tables 307, 314, and/or 324, querying the table returns the location of the patch segment associated with the requested memory segment. The memory access request is serviced by accessing the requested data in the patch segment at the corresponding patch memory address instead of in the original memory segment, where accessing the data can include reading data from the patch segment or writing data to the patch segment according to the memory access request.

At block 431, if an excess of correctable memory errors were detected as a result of the memory access in blocks 429 or 433, then the process 400 continues at block 413. From block 413, the process 400 proceeds to remap the failing memory segment in which the excess correctable errors were detected. At block 433, if an uncorrectable error is detected as a result of the memory access in blocks 429 or 433, the process 400 continues at block 411. The associated cache line is poisoned, and the faulted memory segment is remapped as previously discussed. In one embodiment, if a patch segment becomes faulted or failing, the remapping table is updated to associate the original faulty segment with a new patch segment.

Figure 5:
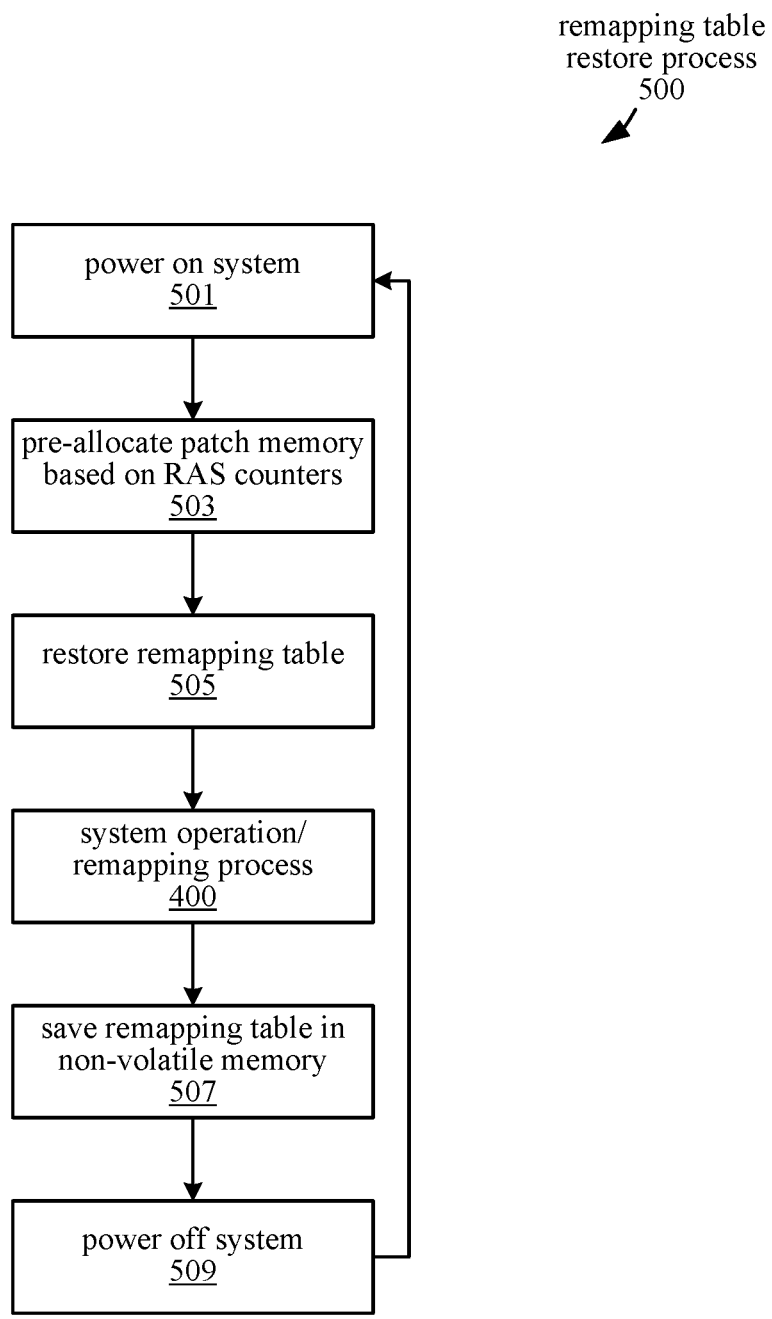
FIG. 5 is a flow diagram illustrating a process for restoring remapping tables in a computing system, according to an embodiment.

FIG. 5 is a flow diagram illustrating a process 500 in which a remapping table is saved and restored, according to an embodiment. Remapping tables stored in volatile memory such as SRAM are saved to non-volatile memory prior to powering down, overwriting, or erasing the volatile memory. When the system 100 resumes, the remapping tables are restored. Thus, faults persisting in the main memory need not be redetected and remapped again. Process 500 is performed by the components in the computing system 100.

At block 501, the computing system 100 is powered on, after which the patch memory is reserved at boot time for backing faulty memory segments to be detected during subsequent operation of the system 100. The amount of memory capacity allocated as patch memory is determined based on the error metrics recorded in the RAS counters 304. In FIG. 3A, for example, patch memory is pre-allocated in the SRAM patch blocks 323 and 313 and in DRAM 316 and 326 based on the error metrics (e.g., uncorrectable error rate, etc.) in the RAS counters 304 from previous runs.

At block 505, remapping tables generated during earlier runs of the system 100 are restored to their original locations 307, 314, and 324. The restored remapping tables 307, 314, and 324 are used for servicing memory requests directed at faulty memory segments during normal system operation 400. At block 400, the remapping tables are updated when additional faulty blocks are detected, as previously described with reference to FIG. 4. At block 507, the updated remapping tables are saved in non-volatile memory prior to powering off the system at block 509. Thus, the saved remapping tables are available for use during the next run, after the system is powered on again at block 501.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
   in a first memory device, reserving memory capacity as a patch memory region for backing faulted memory;
   receiving a memory error indication indicating an uncorrectable error in a faulted segment in a second memory device;
   in response to the memory error indication, associating in a remapping table the faulted segment with a patch segment in the patch memory region, wherein the faulted segment is smaller than a memory page size of the second memory device; and
   in response to receiving from a processor a memory access request directed to the faulted segment, servicing the memory access request from the patch segment by:
      querying the remapping table to determine a patch segment address corresponding to a requested memory address specified by the memory access request, wherein the patch segment address identifies the location of the patch segment, and
      based on the patch segment address, performing the requested memory access at the patch segment.

2. The method of claim 1, wherein:
   the first memory device comprises a static random access memory (SRAM) device in a local memory controller of the second memory device; and
   the method further comprises storing the remapping table in the first memory device.

3. The method of claim 1, wherein:
   the second memory device resides in a first memory node of a non-uniform memory access (NUMA) computing system and the first memory device resides in a second memory node of the NUMA computing system; and
   the method further comprises storing the remapping table in a processing node of the NUMA computing system.

4. The method of claim 1, further comprising:
   in response to detecting that one or more threads associated with the faulted segment are executing within the same non-uniform memory access (NUMA) node as the second memory device, selecting as the first memory device a local memory device residing within the same NUMA node as the second memory device.

5. The method of claim 1, further comprising:
   in response to determining that the second memory device is subject to memory wear-out, selecting as the first memory device a dynamic random access (DRAM) memory device in a different NUMA node than the second memory device.

6. The method of claim 1, further comprising:
   in a set of reliability, availability, and serviceability (RAS) counters, tracking a rate of uncorrectable errors occurring in the second memory device; and
   determining a size of the memory capacity reserved as the patch memory region based on the rate of uncorrectable errors.

7. The method of claim 1, further comprising:
   prior to receiving the memory access request, copying data from the faulted segment to the patch segment; and
   recording an indication that data in a cache line corresponding to the faulted segment is corrupt.

8. The method of claim 1, further comprising:
   in the remapping table, associating a failing segment in the second memory device with a second patch segment in the patch memory region in response to an indication that a rate of correctable errors in the failing segment has exceeded a threshold error rate.

9. The method of claim 1, further comprising:
   copying the remapping table to a non-volatile memory; and
   restoring the remapping table from the non-volatile memory.

10. A computing device, comprising:
    a remapping table configured to associate a faulty memory segment with a patch segment in a patch memory region; and
    control logic circuitry coupled with the remapping table and configured to:
       in a first memory device, reserve memory capacity as the patch memory region for backing faulted memory;
       receive a memory error indication indicating an uncorrectable error in a faulted segment in a second memory device;
       in response to the memory error indication, associate in the remapping table the faulted segment with the patch segment, wherein the faulted segment is smaller than a memory page size of the second memory device;
       in response to receiving from a processor a memory access request directed to the faulted segment, servicing the memory access request from the patch segment by:
          querying the remapping table to determine a patch segment address corresponding to a requested memory address specified by the memory access request, wherein the patch segment address identifies the location of the patch segment, and
          based on the patch segment address, performing the requested memory access at the patch segment.

11. The computing device of claim 10, wherein:
    the first memory device comprises a static random access memory (SRAM) device in a local memory controller of the second memory device; and
    the method further comprises storing the remapping table in the first memory device.

12. The computing device of claim 10, further comprising:
    a set of reliability, availability, and serviceability (RAS) counters configured to track a rate of uncorrectable errors occurring in the second memory device; and
    determining a size of the memory capacity reserved as the patch memory region based on the rate of uncorrectable errors.

13. The computing device of claim 10, further comprising:
    in response to detecting that one or more threads associated with the faulted segment are executing within the same non-uniform memory access (NUMA) node as the second memory device, selecting as the first memory device a local memory device residing within the same NUMA node as the second memory device.

14. The computing device of claim 10, further comprising:
  in response to determining that the second memory device is subject to memory wear-out, selecting as the first memory device a dynamic random access (DRAM) memory device in a different NUMA node than the second memory device.

15. The computing device of claim 10, further comprising:
  in the remapping table, associating a failing segment in the second memory device with a second patch segment in the patch memory region in response to an indication that a rate of correctable errors in the failing segment has exceeded a threshold error rate.

16. A computing system, comprising:
  a first memory device configured to store a remapping table, wherein the remapping table is configured to associate a faulty memory segment with a patch segment in a patch memory region for backing faulted memory; and
  a second memory device configured to store application data;
  control logic coupled with the first memory device and the second memory device, wherein the control logic is configured to:
    reserve memory capacity in the first memory device as the patch memory region;
    receive a memory error indication indicating an uncorrectable error in a faulted segment in a second memory device;
    in response to the memory error indication, associate in the remapping table the faulted segment with the patch segment, wherein the faulted segment is smaller than a memory page size of the second memory device;
    in response to receiving from a processor a memory access request directed to the faulted segment, servicing the memory access request from the patch segment by:
      querying the remapping table to determine a patch segment address corresponding to a requested memory address specified by the memory access request, wherein the patch segment address identifies the location of the patch segment, and
      based on the patch segment address, performing the requested memory access at the patch segment.

17. The computing system of claim 16, wherein:
  the computing system comprises a plurality of NUMA nodes connected by a data fabric;
  the first memory device resides in a first NUMA node;
  the second memory device resides in a second NUMA node; and
  the controller device resides in a processing unit of a NUMA processing node.

18. The computing system of claim 16, wherein:
  the first memory device comprises a static random access memory (SRAM) device in a local memory controller of the second memory device; and
  the control logic is further configured to store the remapping table in the first memory device.

19. The computing system of claim 16, further comprising:
  a set of reliability, availability, and serviceability (RAS) counters configured to track a rate of uncorrectable errors occurring in the second memory device, wherein the control logic is further configured to determine a size of the memory capacity reserved as the patch memory region based on the rate of uncorrectable errors.

20. The computing system of claim 16, wherein:
  the control logic is further configured to, in the remapping table, associate a failing segment in the second memory device with a second patch segment in the patch memory region in response to an indication that a rate of correctable errors in the failing segment has exceeded a threshold error rate.

* * * * *